Nov. 11, 1969  L. BAUER  3,478,186
PUSHBUTTON ASSEMBLY INCORPORATING SELF-FASTENING ELEMENTS
Filed May 2, 1968

INVENTOR
LUDWIG BAUER

BY Delbert O. Warner

ATTORNEY 3,478,186
PUSHBUTTON ASSEMBLY INCORPORATING
SELF-FASTENING ELEMENTS
Ludwig Bauer, Stuttgart-Stammheim, Germany, assignor to International Standard Electric Corporation, New York, N.Y., a corporation of Delaware
Filed May 2, 1968, Ser. No. 726,036
Claims priority, application Germany, May 11, 1967, St 26,860
Int. Cl. H01h *3/02, 3/12*
U.S. Cl. 200—172                                    10 Claims

ABSTRACT OF THE DISCLOSURE

A pushbutton assembly having self-locking elements is provided. The shaft of a pushbutton is provided with a stud which is inserted through a keyhole in a housing. The stud pushes against a spring-biased magnet, is turned to fit into a recess in the spring-biased magnet, and is locked in the recess when the spring restores the magnet to its original position. The pushbutton is not removable by further pushing due to interaction of the spring, the stud and the recess. However, the stud can be dislodged from the recess by a pin inserted through a suitable hole which is hidden by a locked cover.

---

Figure 1:
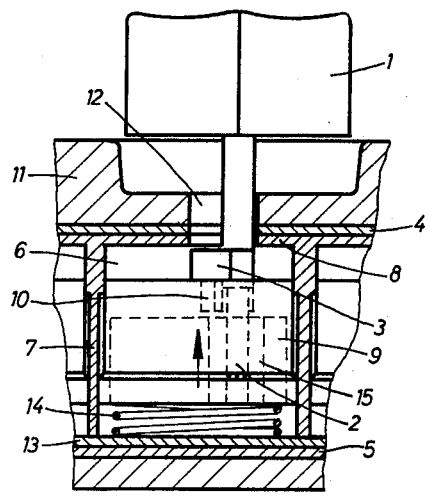

The invention relates to a removable fastening arrangement for individual pushbuttons or for groups of pushbuttons combined in pushbutton or key sets. The invention has particular application in telecommunication engineering.

It is known to provide a pushbutton, placed on to the shaft of a key or button, with an opening transverse to the actuating direction and to connect both parts firmly, though removably, by a driven-in pin.

In another known solution the shaft has a radial groove on the outside and the appertaining pushbutton has on its bottom side an inwardly directed bead, so that the pushbutton, when placed on to the shaft, engages into the groove with the bead.

In a particular embodiment, the pushbutton is fastened on a tube-shaped shaft and prevented from twisting by a radial groove. A resilient retainer ring is inserted into the groove, whereby one end of said ring, bent towards the outside at an angle, is inserted into the drillhole passing through the pushbutton and through the wall of the shaft.

Frequently round shafts are used, made safe against twisting by milled-out or quenched surfaces, or the shaft has an angular or cornered cross-section. The pushbutton itself is fixed to such shafts in one of the ways which has been described.

All these simple fastening means have the disadvantage that the pushbutton is accessible and removable from the outside, which can be a great disadvantage if the pushbuttons are installed in control equipment exposed to possibilities for tampering. If it is necessary to prevent the removal of such pushbuttons in key sets, as in pay stations, they must be arranged so that only the technical personnel of the telephone companies are able to manipulate the pushbuttons.

It is, therefore, an object of the invention to provide a pushbutton which is protected against twisting, is formlocking and is not subject to unauthorized removal, but does not require the use of auxiliary retainer means such as screws, pins, resilient retainer rings and the like.

This object and others related to it are achieved according to the invention by use of a stud on the pushbutton shaft, said stud having a shape similar to a key bit. The stud is put in place by being turned in a keyhole passing through a cap, the conductor plate and the intermediate plate bottom and engaging into a recess provided in a magnet fixing device. The magnet fixing device in turn is under spring pressure and is pressed down at first when inserting the stud, and then returns to its original position after the pushbutton is turned, and the recess slides over the stud.

An embodiment of the invention provides a pushbutton shaft having a circular cross-section and provides further that approximately in the center between its ends the stud, similar to a key bit, is arranged at an angle of 45° with respect to the installation position of the pushbutton.

According to another embodiment of the invention the pushbutton, the pushbutton shaft and the stud are manufactured as one spray-molded piece.

According to another embodiment of the invention the end of the shaft opposite to the pushbutton including its stud is inserted into the magnet fixing device, provided with a recess and with a guide, if the pushbutton is not actuated.

According to another embodiment of the invention the magnet fixing device inserted into a chamber of the intermediate plate safe against twisting, is pot-shaped and is pressed towards the intermediate plate bottom with its recess, provided in the bottom of said magnet fixing device and showing towards the pushbutton side, by a compression spring, if the pushbutton is not actuated.

Another embodiment of the invention provides that the magnet fixing device is less high than the chamber in the intermediate plate is deep.

According to another embodiment of the invention the magnet fixing device, inserted into the chamber of the intermediate plate, is movable in the axial direction and consists of one spray-molded piece.

According to another embodiment of the invention the recess in the magnet fixing device is set at an angle of 45° to the installation position of the pushbutton.

According to another embodiment the keyhole, passing through the cap, the conductor plate and the intermediate plate bottom, is arranged at an angle of 90° to the installation position of the pushbutton.

According to another embodiment the dimensions of the keyhole on the conductor plate permit a large surface usable for the conductor leads.

Various advantages are obtained by the design according to the invention. Replacing of the pushbuttons is prevented if keys or key sets are installed into equipment, thus preventing any unauthorized manipulations. No auxiliary parts need be used for fastening the pushbuttons. The pushbuttons are kept irremovable in the key and do not come loose from their fixing devices, even when there has been an unintended pull on a push-button.

Figure 2:
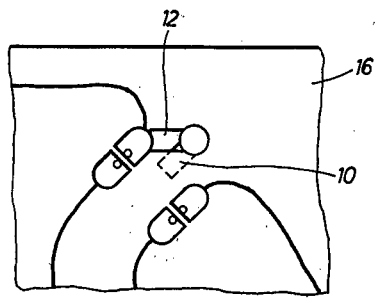

The invention is described with the aid of drawings, wherein:

FIG. 1 illustrates a portion of a key set, partly in section, with an inserted, not yet locked pushbutton, seen from the side, and FIG. 2 shows a part of a key set with the therein arranged keyhole, without cap and pushbutton, seen from top.

In FIG. 1 the pushbutton of a key that can be used for various purposes, is designated with 1. At the bottom side a long pushbutton shaft of varying cross-section is arranged to center about the axis of the pushbutton 1. Approximately half way between the ends of the pushbutton shaft 2 a stud 3 is provided, being simliar to a key bit and staggered to project to one side by 45° with respect to the installation position of said pushbutton 1. The pushbutton 1 with ts shaft 2 and the stud 3 may be made as a single-piece by spray-molding.

An intermediate plate 7, is arranged between two conductor plates 4 and 5. The plate includes printed conductor leads and bounds a chamber 6 for individual pushbuttons. The plate is combined with a key set, in such a way that the bottom 8 of said intermediate plate 7 parallels one side of the pushbutton. A magnet 9, which serves as a fastener, is inserted into the chamber 6 of the intermediate plate. The magnet is ring-shaped or pot-shaped and is used to operate hermetically sealed contacts, melted into glass tubulets. The magnet fastener device 9 may be designed round or cornered in its geometrical shape. If the magnet fixing device is round a guiding groove is provided on its outside in the axial direction which prevents twisting. Besides, the magnet fixing device 9 is arranged in the chamber 6 shiftable in the longitudinal axis. A recess 10 and a drillhole is provided eccentrically in its bottom facing the pushbutton 1, which recess and drillhole corresponds to the key bit like stud 3 and to the exterior diameter of the pushbutton shaft 2. The magnet fixing device 9 consists of a spray-molded portion, manufactured in one piece.

In the conductor plate 4, the intermediate plate bottom 8 and the cap 11, covering the key or the key set, a keyhole 12 is provided, staggered by 90° to the installation position of the pushbutton 1. The installation position of the magnet fixing device 9 is selected so that the drillhole, corresponding to the diameter of the pushbutton shaft 2 coincides with the keyhole 12, but the recess 10 in the magnet fixing device 9, corresponding to the stud 3 of the pushbutton shaft 2 is staggered by the angle of 45° with respect to the installation position of the pushbutton 1.

The chamber 6 within the intermediate plate 7 being open on one side is closed by a cover plate 13. The previously inserted compression spring 14 touches the cover plate 13 and presses with its end, projecting into the pot-shaped magnet fixing device 9, against the bottom of said device, so that the magnet fixing device touches the intermediate plate bottom 8 under pressure of the spring. Since the magnet fixing device 9 is shorter than the chamber 6 in the intermediate plate 7 is deep, the magnet fixing device 9 is movable in the axial direction within the chamber 6.

If the pushbutton 1 is now plugged with its shaft 2 and the stud 3 into the keyhole 12, exerting a slight pressure, the magnet fixing device 9 is shifted and a cavity is opened between said device 9 and the intermediate plate bottom 8.

By turning the pushbutton 1 by 45° its stud 3 is brought into the recess 10 of the magnet fixing device 9 and the compression spring 14, being effective in the direction of the arrow, presses the magnet fixing device 9 towards the intermediate plate bottom 8. The pushbutton shaft 2 is now inserted approximately half into the guide 15, arranged in the magnet fixing device 9, and with its stud 3 in the recess 10 of the magnet fixing device 9. Thus the pushbutton 1 is kept in its installed position form-lockingly and irremovably and is arrested safe against turning and twisting. The long guide 15 of the pushbutton 1 in the magnet fixing device 9 permits a relatively small diameter of the shaft so that only small apertures and/ or keyholes 12 in the conductor plate 4 are necessary, resulting in a large surface 16 usable for the conductor leads.

If the pushbutton 1 is to be replaced by another pushbutton of, e.g., another color or provided with other symbols, this can be done in a simple way by means of a slightly bent paper clip or a similar means. Through openings not shown on the drawing but provided in the cap 11, in the conductor plate 4 and the intermediate plate 7 a slight pressure is exerted on to the magnet fixing device 9 and said fixing device is brought into a position shown in FIG. 1. The thus obtained free space between magnet fixing device 9 and intermediate plate bottom 8 permits to pull out the stud 3 from the recess and a suitable turning so that the pushbutton 1 can be pulled out through the keyhole 12. Another pushbutton is inserted as described above. Replacing of pushbuttons by unauthorized persons is prevented for these key sets in that they are covered, as, e.g., in telephone stations, by a sealed housing cap which cap has the necessary openings for the pushbuttons.

While the principles of the invention have been described above in connection with specific apparatus and applications, it is to be understood that this description is made only by way of example and not as a limitation on the scope of the invention.

What is claimed is:

1. An interlocking pushbutton assembly, comprising:
   a pushbutton, a shaft, and a stud forming a part of a pushbutton assembly,
   a housing forming, together with elements contained therein, the remainder of said assembly,
   said housing enclosing a space and including a keyhole permitting ingress and egress of said stud to said space,
   a magnet and a biasing spring supported within said space, said biasing spring serving to press the magnet against said keyhole,
   said magnet including a recess for receiving said stud,
   said stud, under pressure applied through said pushbutton pushing said magnet against said spring providing space for the stud to be rotated into a position allowing the stud to lodge in said recess in the magnet, and
   said magnet restoring to its original position under urging of the spring as the stud is slid into the recess in the magnet.

2. An interlocking pushbutton assembly according to claim 1, in which:
   the shaft has a circular cross-section and approximately in the center of said shaft the stud is arranged to form a key bit at an angle of 45° with respect to the installation position of the pushbutton.

3. An interlocking pushbutton assembly according to claim 1, in which:
   the pushbutton, the shaft and the stud is manufactured as one spray-molded piece.

4. An interlocking pushbutton assembly according to claim 1, in which:
   the pushbutton shaft has an end opposite to the pushbutton,
   said end supports the stud,
   the stud is positioned in the recess in the magnet, and the magnet is restrained from rotating by a guide.

5. An interlocking pushbutton assembly according to claim 1, in which:
   the magnet in the space is restrained against turning, is pot-shaped and is pressed with its recess arranged at its bottom and facing the push-button end, towards the keyhole by the biasing spring when the key is not actuated.

6. An interlocking pushbutton assembly according to claim 5, in which:
   the magnet is shorter than the space in the housing is deep.

7. An interlocking pushbutton assembly according to claim 6, in which:
   the magnet inserted into the space in the housing is movably arranged in the axial direction and consists of one spray-molded piece.

8. An interlocking pushbutton assembly according to claim 1, in which:

the recess in the magnet is arranged at an angle of 45° with respect to the installation position of the pushbutton.

9. An interlocking pushbutton assembly according to claim 1, in which:
the housing includes a conductor plate, an intermediate plate bottom and the keyhole is arranged at an angle of 90° with respect to the installation position of the pushbutton.

10. An interlocking pushbutton assembly according to claim 9, in which:
the dimensions of the keyhole permit a large surface on the conductor plate, which surface can be used for the conductor leads.

References Cited

UNITED STATES PATENTS

| | | | |
|---|---|---|---|
| 2,171,368 | 8/1939 | Krieger | 200—172 |
| 2,995,640 | 8/1961 | Panerai et al. | |
| 3,172,985 | 3/1965 | De Smidt. | |
| 3,185,783 | 5/1965 | Dowdle et al. | |
| 3,360,627 | 12/1967 | Wessel. | |
| 3,367,206 | 2/1968 | Moody | 200—172 |

H. O. JONES, Primary Examiner

U.S. Cl. X.R.

200—153